United States Patent [19]

Kume et al.

[11] Patent Number: 5,727,111
[45] Date of Patent: Mar. 10, 1998

[54] OPTICAL PICK-UP AND LIGHT DETECTING COVER THEREFOR

[75] Inventors: Hidehiro Kume, Tokyo; Kimihiro Saito, Saitama; Shuzo Sato; Takeshi Kubo, both of Kanagawa, all of Japan

[73] Assignee: Sony Corporation, Japan

[21] Appl. No.: 661,460

[22] Filed: Jun. 11, 1996

[30] Foreign Application Priority Data

Jun. 19, 1995 [JP] Japan .................................. 7-175407
Sep. 25, 1995 [JP] Japan .................................. 7-270593

[51] Int. Cl.⁶ .................................. G02B 6/00; G11B 7/00
[52] U.S. Cl. .................................. 385/147; 385/94; 369/44.12; 369/44.23; 257/433
[58] Field of Search .................................. 385/147, 92–94, 385/36, 31, 33; 369/44.12, 44.14, 44.23, 44.24, 121–122; 257/433–436; 359/737, 615

[56] References Cited

U.S. PATENT DOCUMENTS

| | | | |
|---|---|---|---|
| 5,005,162 | 4/1991 | Mitsumori et al. | 369/44.12 |
| 5,181,193 | 1/1993 | Kume et al. | 369/44.41 |
| 5,374,819 | 12/1994 | Kim et al. | 369/44.23 |
| 5,396,061 | 3/1995 | Taniguchi et al. | 257/436 |

Primary Examiner—Rodney B. Bovernick
Assistant Examiner—Hemang Sanghavi
Attorney, Agent, or Firm—Ronald P. Kananen

[57] ABSTRACT

A light-deflecting cover for an optical pick-up apparatus has a reflecting portion disposed within a light path of a light beam projected from a light source or light returning from outside the apparatus for deflecting an optical beam for bending the light path. The light deflecting part of the cover is provided with a light absorbing portion for removing unnecessary light which does not contribute to the operating characteristics of optical equipment within which the light deflecting part is provided. The optical pick-up comprises a light-emitting and detecting device, an optical system for focusing and projecting a laser light outputted from the light-emitting and detecting device onto a signal recording surface of an optical disc, and guiding light returning from the signal recording surface of the optical disc to the light-emitting and detecting device and a light deflecting part having a reflecting portion disposed in the light path of the light system for deflecting the light beam for bending the light path, the light deflecting part comprising a light absorbing portion for removing unnecessary light which does not contribute to the operating characteristics of the optical pick-up in which the light deflecting part is provided.

26 Claims, 14 Drawing Sheets

OPTICAL PICK-UP AND LIGHT DETECTING COVER THEREFOR

BACKGROUND OF THE INVENTION:

1. Field of the Invention

The present invention relates to an optical pick-up for optical disc recording/playback devices for, for example, mini-discs (MDs), compact discs (CDs) or recording/ playback devices of computers utilizing these media. More particularly, this invention relates to an optical pick up apparatus for emitting and detecting a light beam and having a cover for correcting an astigmatic difference in the beam from the light emitting means. Still more particularly, this invention relates to an optical pick up apparatus of the type described in which the cover member includes a light absorbing portion and a light reflecting portion and is formed in various configurations.

2. Related Art

Conventionally, optical pick-ups for use in compact discs have been constructed as shown, for example, in FIG. 1. In FIG. 1, an optical pick-up 21 includes a lens holder 23 shaped and configured to hold an objective lens 22. The optical pick-up further includes a base 24 supporting a composite light-emitting and detecting device 25 for coaction with an optical system 26.

At the optical pick-up 21, by shifting the lens holder 23 in either or both focusing and tracking directions, laser light L1 outputted from the light-emitting and detecting device 25 travels by way of the optical system 26 and the objective lens 23 and is focused at a point on a signal recording surface 27a of an optical disc 27. The optical disc 27 is rotatably driven as shown by the arrow a above the disc 27. Reflected laser light, or returning light, reflected by the signal recording surface 27a of the optical disc 27 then passes through the objective lens 22 and the optical system 26 and re-enters the light-emitting and detecting device 25.

The optical system 26 has a raised reflecting mirror 26a mounted for both guiding laser light L1 outputted from the light-emitting and detecting device 25 to the objective lens 22 and guiding light L1 returning from the optical disc 27 from the objective lens 22 to the light-emitting and detecting device 25. Thus, laser light outputted from the light-emitting and detecting device 25 is then caused to be focused at the signal recording surface 27a of the optical disc 27 by way of the raised mirror 26a and the objective lens 22 by shifting and adjusting the position of the objective lens 22 in the focusing and tracking directions using a bi-axial actuator (not shown) in the drawings for driving the objective lens 22 in bi-axial directions. Returning laser light reflected at the signal recording surface 27a of the optical disc 27 becomes incident to the light-emitting and detecting device 25 by way of the objective lens 22 and the raised mirror 26a.

At the light-emitting and detecting device 25, as shown in FIG. 2, a second semiconductor substrate 25b for outputting light is mounted on a first semiconductor substrate 25a, and a light-emitting semiconductor laser 25c is mounted on the second semiconductor substrate 25b for emitting the laser light L1. A generally trapezoidal-shaped micro-prism 25d is provided on the first semiconductor substrate 25a in front or forward of the semiconductor laser element 25c so that an inclined, partially-transparent surface 25h of the prism 25d faces the semiconductor laser 25c.

Further, the entire light-emitting and detecting device 25 is covered by a cover, shown generally by the reference numeral 28. The cover 28 has reflecting surface 28a inclined at an angle of 45-degrees which is provided at the inner surface 28f of the cover 28 so as to face the raised mirror 26a.

In this way, the light beam outputted from the semiconductor laser 25c along a horizontal surface of the second semiconductor substrate 25b is reflected at the inclined surface 25h of the microprism 25d and proceeds in an upward direction. The light is then reflected by the reflecting surface 28a on the inner surface 28f of the cover 28 and proceeds in a direction toward the raised mirror 26a. The light beam reflected by the raised mirror 26a then passes through the objective lens 22 and is made to converge at the signal recording surface 27a of the optical disc 27. The light returning from the signal recording surface of the optical disc 27 enters within the microprism 25d from the inclined surface 25h of the microprism 25d by traveling again by way of the objective lens 22, the raised mirror 26a and the reflecting surface 28a of the cover 28 before reaching the bottom surface of the microprism 25d. Part of the returning light that reached the bottom surface of this microprism 25d passes through the bottom surface, and part is reflected by the bottom surface before proceeding on the upper surface of the microprism 25d.

Here, as shown in FIG. 2, a first light detector 25e is formed on the first semiconductor substrate 25a at the lower part of the position of incident returning light of the microprism 25d. Further, returning light reflected at the bottom surface is reflected inside at the upper surface of the microprism 25d and again becomes incident to the bottom surface of the microprism 25d. Then, a second light detector 25f is formed on the first semiconductor substrate 25a at the lower part of the bottom surface portion of the microprism 25d to which the returning light having been reflected at the upper surface of the microprism is incident.

The first light detector 25e and the second light detector 25f are divided into a plurality of sensor blocks, with detection signals for each of the sensor blocks being outputted independently. A third light detector 25g is provided on the second semiconductor substrate 25b on the side opposite to the output side of the semiconductor laser 25c. The third light detector 25g monitors the intensity of the light emitted at the semiconductor laser 25c. The light-emitting and detecting device 25 is thus an optical block comprising a light-emitting element and a light-receiving element enclosed together in a closed unit 25i formed as a single body, as shown, for example, in FIG. 3.

According to the optical pick-up 21 constructed in this manner, laser light outputted from the semiconductor laser 25c of the light-emitting and detecting device 25 is incident to and reflected from the inclined surface 25h of the microprism 25d. Laser light reflected at the inclined surface 25h of the microprism 25d then travels by way of the raised mirror 26a and the objective lens 22 and is focused onto a point at a desired track position of the signal recording surface 27a of the optical disc 27. Light returning from the optical disc 27 again travels via the objective lens 22 and the raised mirror 26a, is incident to the inclined surface 25h of the microprism 25d of the light-emitting and detecting device 25, and then proceeds to within the microprism 25d by passing through the inclined surface.

Returning light incident within the microprism 25d then reaches the bottom surface of the microprism 25d. A portion of the returning light which was incident to the bottom surface passes through and a portion is reflected in the direction of the upper surface of the microprism 25d. Returning light which has passed through the bottom surface is incident to the first light detector 25e. On the other hand, returning light reflected at the bottom surface is reflected by the upper surface of the microprism 25d, passes through the bottom surface of the microprism 25d, and is then incident to the second light detector 25f.

Light returning in this way is incident to the first light detector 25e and the second light detector 25f. A playback signal is therefore detected on the basis of detection signals from each of the sensor blocks of the light detectors 25e and 25f, a focus signal is detected by, for example, using a so-called "differential dividing factor of three" method (also referred to as a "D-3DF method"), and a tracking error signal is detected using a so-called push-pull method and so forth on the basis of detection signals from each of the sensor parts of the first light detector 25e.

While the foregoing embodiment was an improvement over the art prior to this related art, however, with the optical pick-up 21 for use with a compact disc shown in FIG. 1, only a part of the light beam projected from the semiconductor laser 25c of the light-emitting and detecting device 25 reaches the optical disc 27 and contributes to the playback signal of the optical disc 27. Namely, only a part of the light beam projected from the surface of the semiconductor laser 25c on the opposite side to the microprism 25d becomes incident to the third light detector 25g to be used for monitoring the light intensity, while another light beam is considered unnecessary and is therefore diffused within the cover 28, as shown by the slanted line in FIG. 1. Stray light, which is detrimental to the operating characteristics of the optical pick-up 21, therefore occurs as a result of such diffusion of unnecessary light. This situation is thus damaging to a stable operation of the optical disc 27 played back using the optical pick-up 21.

By enclosing the optical pick-up 21 in a package as representatively shown in FIG. 3, the internal optical parts are shielded from the outside and a higher degree of reliability is obtained. This proves to be a hindrance, however, with respect to making the optical pick-up smaller and cheaper. Because of this, as shown in FIG. 4, a so-called integrated optical pick-up where the light-emitting and detecting device is formed as a single body has been proposed. In FIG. 4, an optical pick-up shown generally at reference numeral 29 has a light-emitting and detecting element 25 disposed directly on a substrate 29a on which circuits for signal processing and the like for the optical pick-up 29 are constructed. Further, a bi-axial (or a so-called twin-axial) actuator 29b for adjustably shifting the lens holder 23 equipped with the objective lens 22 in the focusing and tracking directions and a raised mirror 26a for the optical system 26 are also mounted on the substrate 29a. With the integrated optical pick-up 29 having this kind of structure, unnecessary light from the semiconductor laser 25c is further amplified, which is further detrimental to the operation of the optical pick-up 29.

Conventionally, optical pick-ups for use with compact discs are also or alternatively constructed as shown in, for example, FIG. 5, which is operationally similar to the convention pick-up shown in FIG. 1. The optical pick-up shown generally at reference numeral 31 in FIG. 5 includes an objective lens 32, a light-emitting and detecting device 33 fixed on a base (not shown in the drawings) and an optical system 34. At the optical pick-up 31, by shifting the objective lens 32 in the focusing and tracking directions, laser light outputted from the light-emitting and detecting device 33 travels by way of the optical system 34 and the objective lens 32 and is focused at a point on the signal recording surface 35a of the optical disc 35, which is rotatably driven above the objective lens 32, as in FIG. 5.

The optical system 34 is for guiding laser light projected from the light-emitting and detecting device 33 to the objective lens 32 and for guiding light returning from the optical disc 35 from the objective lens 32 to the light-emitting and detecting device 33, functions like that shown in FIG. 1; however, in the case shown in the drawings, the device 33 is constructed from two mirrors 34a and 34b for bending the light path to correct for astigmatic differences. Laser light projected from the light-emitting and detecting device 33 is focused onto the signal recording surface of the optical disc 35 via the mirrors 34a and 34b of the optical system 34 and the objective lens 32 as a result of adjustably shifting the objective lens 32 in the focusing and tracking directions using a twin-axial or bi-axial actuator (not shown in the drawings). Light returning from the signal recording surface 35a of the optical disc 35 thus becomes incident to the light-emitting and detecting device 33 via the objective lens 32 and the mirrors 34a and 34b of the optical system.

The light-emitting and detecting device 33 consists of a second semiconductor substrate 33b for outputting light mounted on a first semiconductor substrate 33a, with a semiconductor laser element 33c mounted as a light-emitting element on the second semiconductor substrate 33b, as shown in FIGS. 6 and 7, and functionally similar to the system shown in FIGS. 2 and 3. A generally trapezoidal-shaped microprism 33d is provided on the first semiconductor substrate 33a in front of the semiconductor laser element 33c in such a manner that the inclined partially transparent surface 35h of the prism 33d faces the semiconductor laser element 33c. Further, the light-emitting and detecting device 33 is housed within a right-angled parallelepiped-shaped case 36, the upper end of which is open. The upper end of the case 36 is then sealed using a glass plate 37, as best seen in FIG. 6. In this way, a laser beam projected from the semiconductor laser element 33c along the surface of the second semiconductor substrate 33b is reflected at the inclined surface 33h of the microprism 33d, proceeds in an upward direction, passes through the glass cover plate 37, and then proceeds in the direction of the mirror 34a of the optical system 34 shown in FIG. 5. The light beam reflected by the mirror 34a is then focused onto the signal recording surface 35a of the optical disc 35 via the objective lens 32 after having been reflected by the mirror 34b of the optical system 34. Light returning from the signal recording surface 35a of the optical disc 35 then becomes incident within the microprism 33d from the inclined surface of the microprism 33d after again passing via the objective lens 32, the mirrors 34b and 34a of the optical system 34 and the glass plate 37, and then reaches the bottom surface of the microprism 33d. Part of the returning light which has reached the bottom surface of the microprism 33d passes through the bottom surface and part is reflected by this bottom surface in such a manner as to proceed in the direction of the upper surface.

A first light detector 33e is formed at the first semiconductor substrate 33a at the lower part of the position of incident returning light of the microprism 33d. Further, returning light reflected at the bottom surface is then reflected at the upper surface of the microprism 33d and again becomes incident to the bottom surface of the microprism 33d. A second light detector 33f is then formed at the first semiconductor substrate 33a at the lower part of the microprism 33d to which returning light reflected at the upper surface of the microprism 33d is incident.

The first light detector 33e and the second light detector 33f are divided into a plurality of sensor blocks, with detection signals for each of the sensor blocks being outputted independently. A third light detector 33g is provided on the second semiconductor substrate 33b on the opposite side from the output side of the semiconductor laser 33c. The third light detector 33g is for monitoring the intensity of the light emitted at the semiconductor laser 33c. According to the optical pick-up 31 of this kind of structure, laser light projected from the semiconductor laser element 33c of the light-emitting and detecting device 33 is incident to the inclined surface 33h of the microprism 33d and is reflected by the inclined surface 33h. Laser light reflected at the inclined surface 33h of the microprism 33d is focused onto a point at a desired track position of the signal recording surface 35a of the optical disc 35 via the mirrors 34a and 34b of the optical system 34 and the objective lens 32. Light returning from the optical disc 35 travels again via the objective lens 32 and the mirrors 34b and 34a of the optical system 34 so as to be incident to the inclined surface 33h of the microprism 33d of the light-emitting and detecting device 33 and then proceeds to within the microprism 33d by passing through the inclined surface.

Returning light incident within the microprism 33d reaches the bottom surface of the microprism 33d. A portion of the returning light incident at the bottom surface passes through and another portion is reflected in the direction of the upper surface of the microprism 33d. Part of the returning light which passes through the bottom surface is incident to the first light detector 33e while, on the other hand, returning light reflected at the bottom surface is reflected by the upper surface of the microprism 33d, passes through the bottom surface of the microprism 33d and is then incident to the second light detector 33f. Light returning in this way is incident to the first light detector 33e and the second light detector 33f. A playback signal is detected on the basis of detection signals from each of the sensor blocks of the light detectors 33e and 33f, a focus signal is detected by, for example, using a so-called differential dividing factor of three method (i.e., the aforementioned "D-3DF method"), and a tracking error signal is detected on the basis of differences in the detection signals from each of the sensor parts of the first light detector 33e.

However, as is the case with the embodiment of FIGS. 1 to 3, with the optical pick-up for use with a compact disc shown in FIG. 5, the optical path has been bent using mirrors 34a and 34b of the optical system 34 so that the overall thickness of the entire optical pick-up 31, i.e. the thickness from the lower surface of the optical disc 35 to the lowermost part of the optical pick-up 31, is kept thin. The number of parts to achieve this therefore becomes large and because it is necessary to accurately decide the position of the each of the mirrors 34a and 34b of the optical system 34, assembly is complicated and the parts costs and assembly costs become high.

Moreover, in order to correct the stigmatic difference of the laser beam projected from the semiconductor laser element 33c, it is well known to provide a semiconductor laser diode 38 such as shown in FIG. 8, which is equipped with an inclined glass plate 38a for astigmatic difference correction on the projection side. However, it is very difficult to incorporate this kind of semiconductor laser diode 38 in the kind of optical pick-up shown in FIG. 5. Further, a third light detector 33g (FIG. 7) is formed on the second semiconductor substrate 33b in such a manner that light projected from the rear side of the semiconductor laser element 33c is incident for monitoring the amount of light for the semiconductor laser element 33c. In this case, light returning from the optical disc 35 is also incident to the third light detector 33g. The ratio of the amount of light projected from the front side and the rear side of the semiconductor laser element 33c therefore changes; thus, the amount of light projected from the semiconductor laser element 33c cannot be accurately monitored. As a result, the strength of the light beam projected on the optical disc 35 cannot be controlled accurately, with this being detrimental to the stability of the playback operation of the optical pick-up 31.

In order to resolve the above points, it is an object of the present invention to provide a light-emitting and detecting device and cover for the device for use with an optical pick-up for which the astigmatic difference can be corrected and which can be made small.

BRIEF SUMMARY OF THE INVENTION

In order to resolve the aforementioned points, it is an object of the present invention to provide a light deflecting part and optical pick-up utilizing the light deflecting part which is small, lightweight and highly reliable by removing the unnecessary light from the light-emitting element.

The above object is achieved, according to the present invention by a light-deflecting cover having a reflecting portion disposed within a light path of a light beam projected from a light source or light returning from outside for deflecting an optical beam for bending the light path, characterized in that the light deflecting part is provided with a light absorbing portion for removing unnecessary light which does not contribute to the operating characteristics of an optical equipment within which the light deflecting part is provided. Further, above object is achieved, according to the present invention, by an optical pick-up characterized by comprising a light-emitting and detecting device, an optical system for focusing and projecting a laser light outputted from the light-emitting and detecting device onto a signal recording surface of an optical disc, and guiding a light returning from the signal recording surface of the optical disc to the light-emitting and detecting device and a light deflecting part having a reflecting portion disposed in the light path of the light system for deflecting a light beam for bending the light path, the light deflecting part comprising a light absorbing portion for removing unnecessary light which does not contribute to the operating characteristics of the optical pick-up in which the light deflecting part is provided.

According to the aforementioned structure, the light deflecting part is equipped with a light absorbing part for removing unnecessary light. Therefore, of the light beam projected from the light-emitting and detecting device of the optical equipment installed with this light deflecting part, for example, the optical pick-up, unnecessary light that does not contribute to the operating characteristics of the optical pick-up is absorbed by being incident to the light absorbing part of the light deflecting part.

According to the present invention, the above object is achieved by a light-emitting and detecting device which comprises first and second light detectors formed on a first semiconductor substrate, a light-emitting element for projecting laser light, formed on a second semiconductor substrate mounted on the first semiconductor substrate, a microprism mounted on the first semiconductor substrate, formed with an inclined surface at the portion on which laser light projected from the light-emitting element is projected, with a bottom surface being formed with a partially transparent film and a non-reflecting film and a completely reflecting layer at the top surface, and a cover for covering the surface of the substrate, the light-emitting element, the light detectors and the microprism, wherein the light-emitting and detecting device has a structure in which the laser light from the light-emitting element is reflected by the inclined surface and is guided to an optical disc, and light returning from the optical disc is incident from the inclined surface to within the microprism and is projected into the first light detector, and laser light reflected at the partially transparent film passes through the non-reflecting film after being reflected at the completely reflecting film so as to irradiate the second light-detector, and wherein the cover is provided with a correcting means for correcting an astigmatic difference in laser light from the light-emitting element. According to the above structure, a correcting means for correcting the astigmatic difference of a light beam from the light-emitting element is integrally formed with the cover at the inner surface of the cover covering the upper surface of the semiconductor substrates, the light-emitting element, the microprism and the first and second light detectors. The correcting means can therefore be easily incorporated and information signals recorded at the signal recording surface of the optical disc can be played-back on the basis of a light-beam with little astigmatic difference.

The following is a detailed description based on the drawings of a preferred embodiment of the present invention. The embodiment described in the following is a specific preferred example of the present invention and as such, various technical limitations have been attached as deemed necessary. However, the scope of the present invention is by no means limited to these embodiments unless otherwise limited within the description of the present invention in the following.

DETAILED DESCRIPTION OF THE PREFERRED EMBODIMENTS

The following is a description with reference to the drawings of the preferred embodiments of the present invention. The embodiment described in the following is a specific preferred example of the present invention relative to the related art, and, as such, various technical limitations have been attached as deemed necessary. However, the scope of the present invention is by no means limited to these embodiments unless otherwise limited within the description of the present invention in the following.

Figure 9:
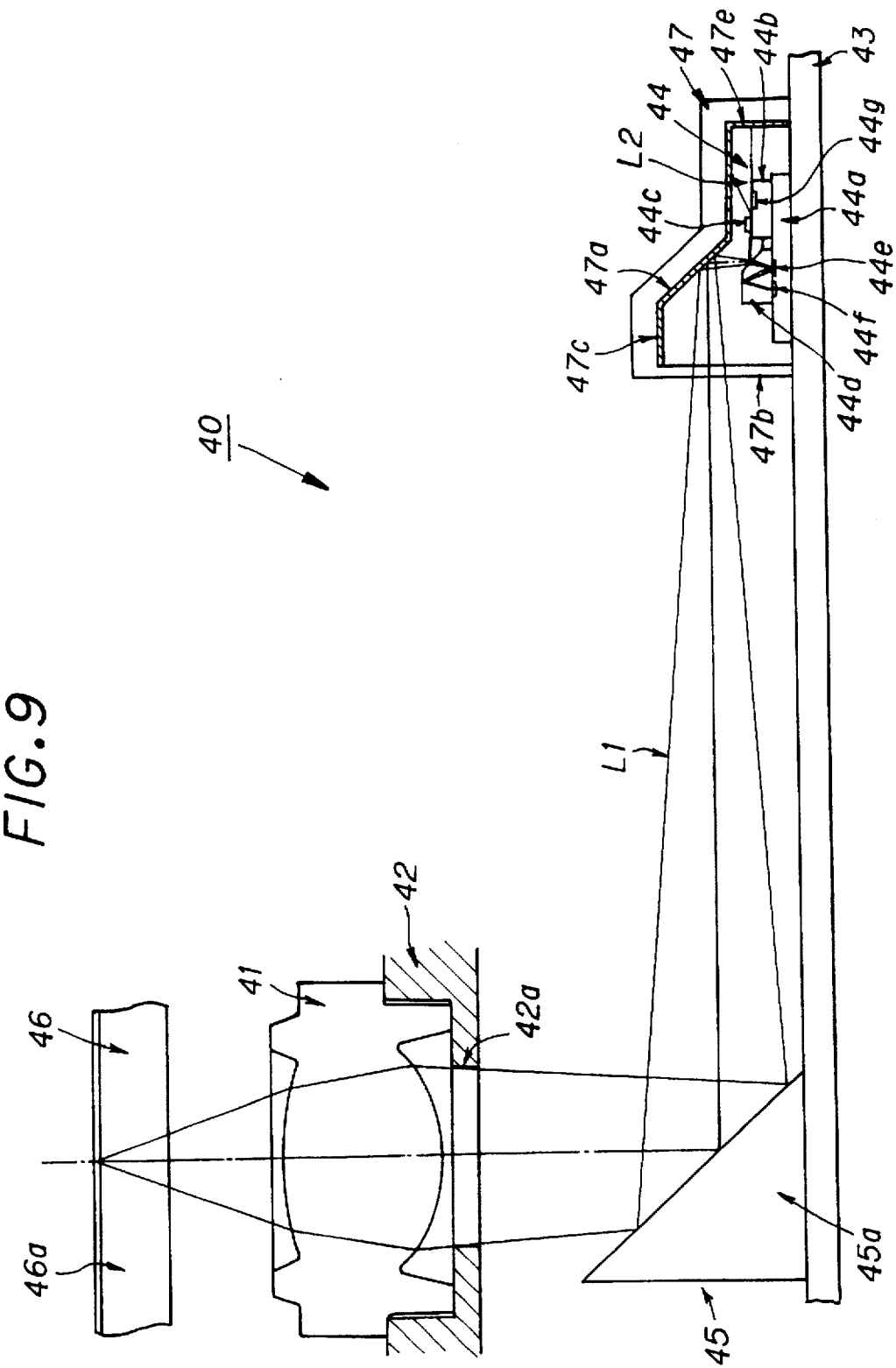
FIG. 9 is a schematic view showing a first embodiment of an optical pick-up equipped with a light deflecting cover according to the present invention.

FIG. 9 is a view showing a preferred embodiment of an optical pick-up for use with a compact disc provided with a light deflecting portion or surface according to the present invention. In FIG. 9, an optical pick-up, shown generally by the reference numeral 40, includes a holder 42 equipped with an objective lens 41, a base or substrate 43, and a light-emitting and detecting device 44 and an optical system 45 provided on the base 43. With this structure, the structure other than that of a cover 47 that encloses the light-emitting and detecting device 44 is the same as for the optical pick-up of FIG. 1, with the following description being directed primarily to its distinctions.

Figure 1:
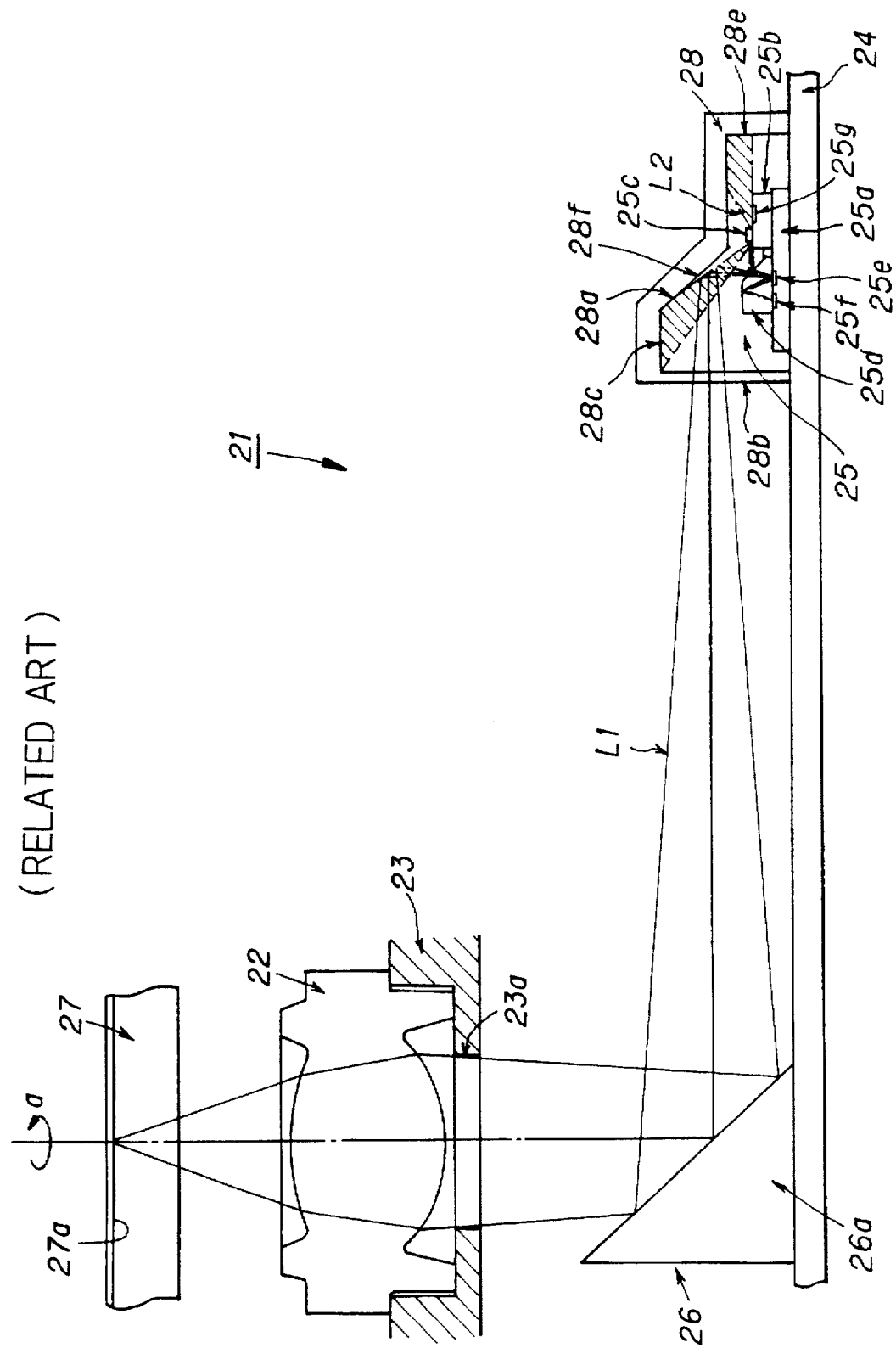
FIG. 1 is a schematic view showing an example of a conventional optical pick-up.
Figure 2:
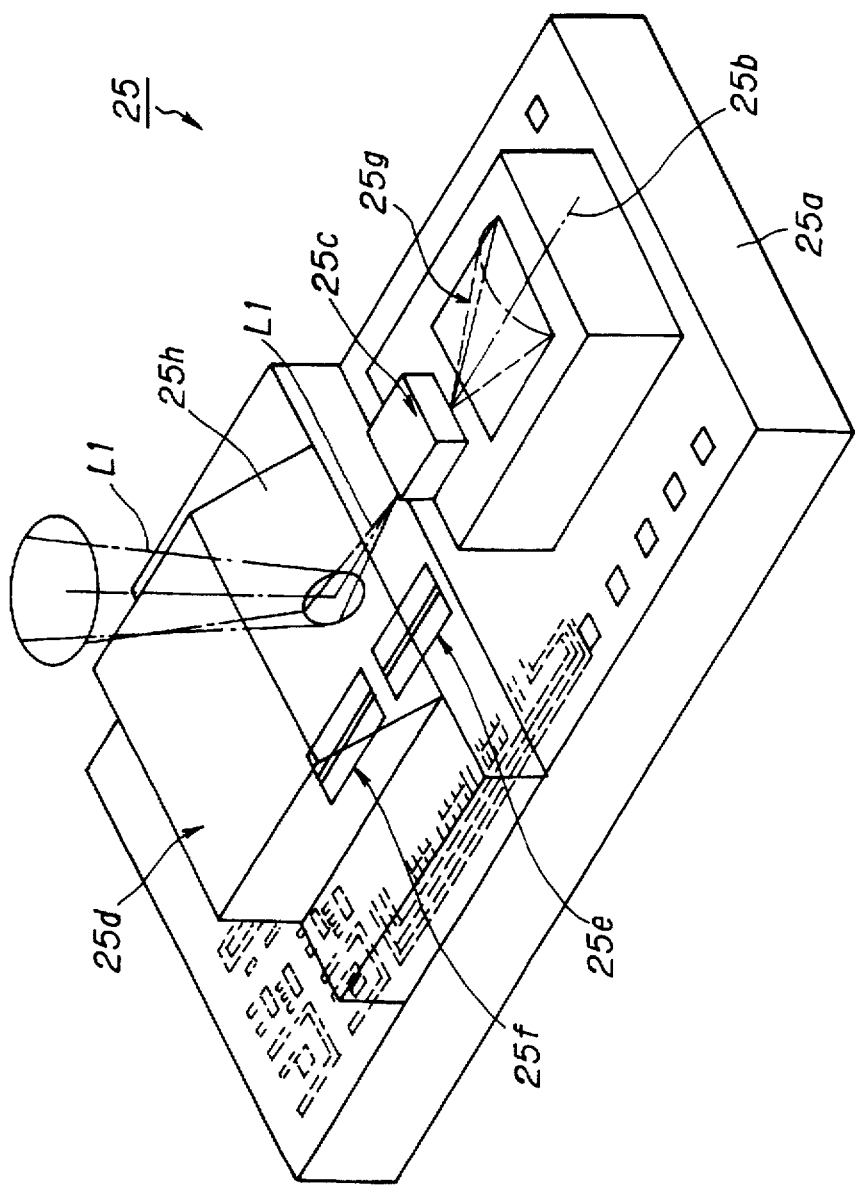
FIG. 2 is an enlarged perspective view showing the structure of a light-emitting and detecting device of the optical pickup of FIG. 1.
Figure 3:
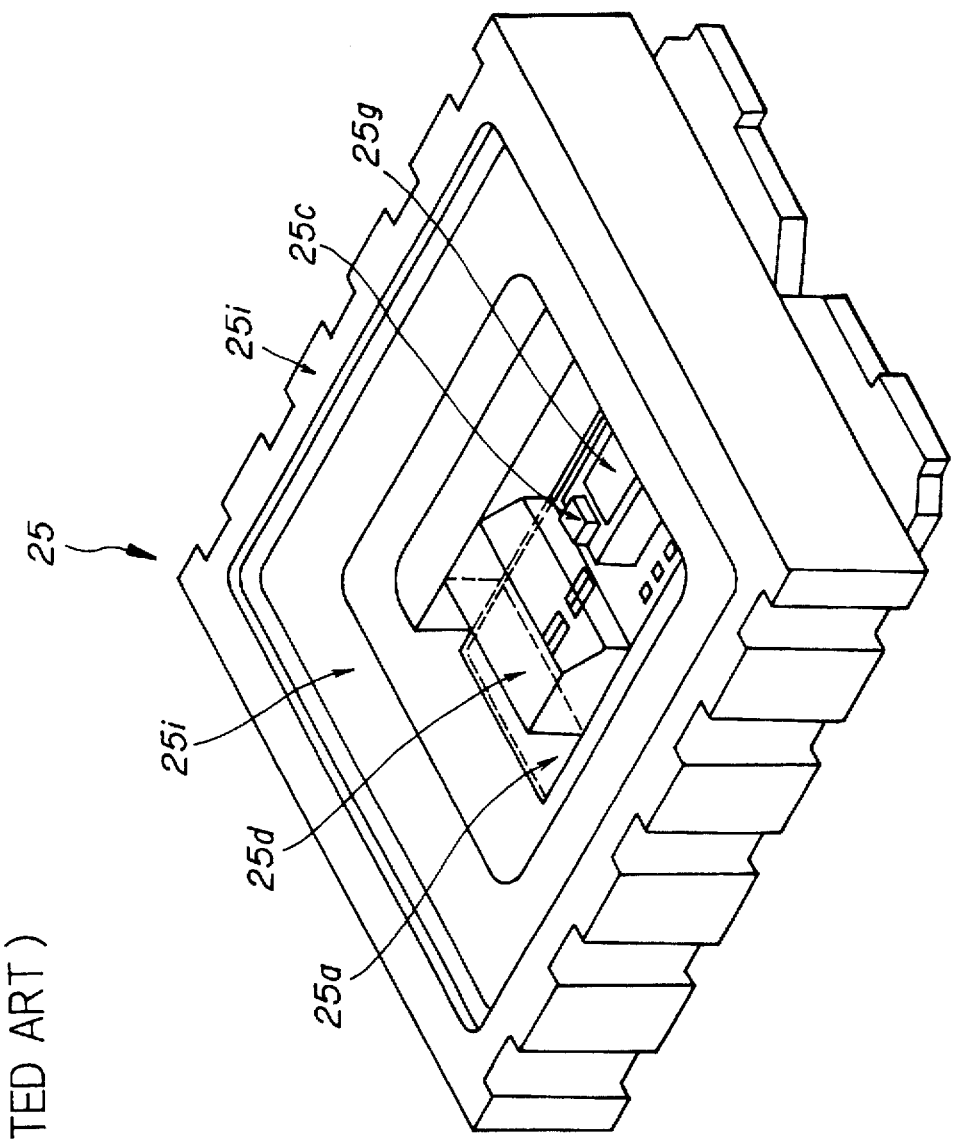
FIG. 3 is a perspective view showing the package for the light-emitting and detecting device of FIG. 2.
Figure 4:
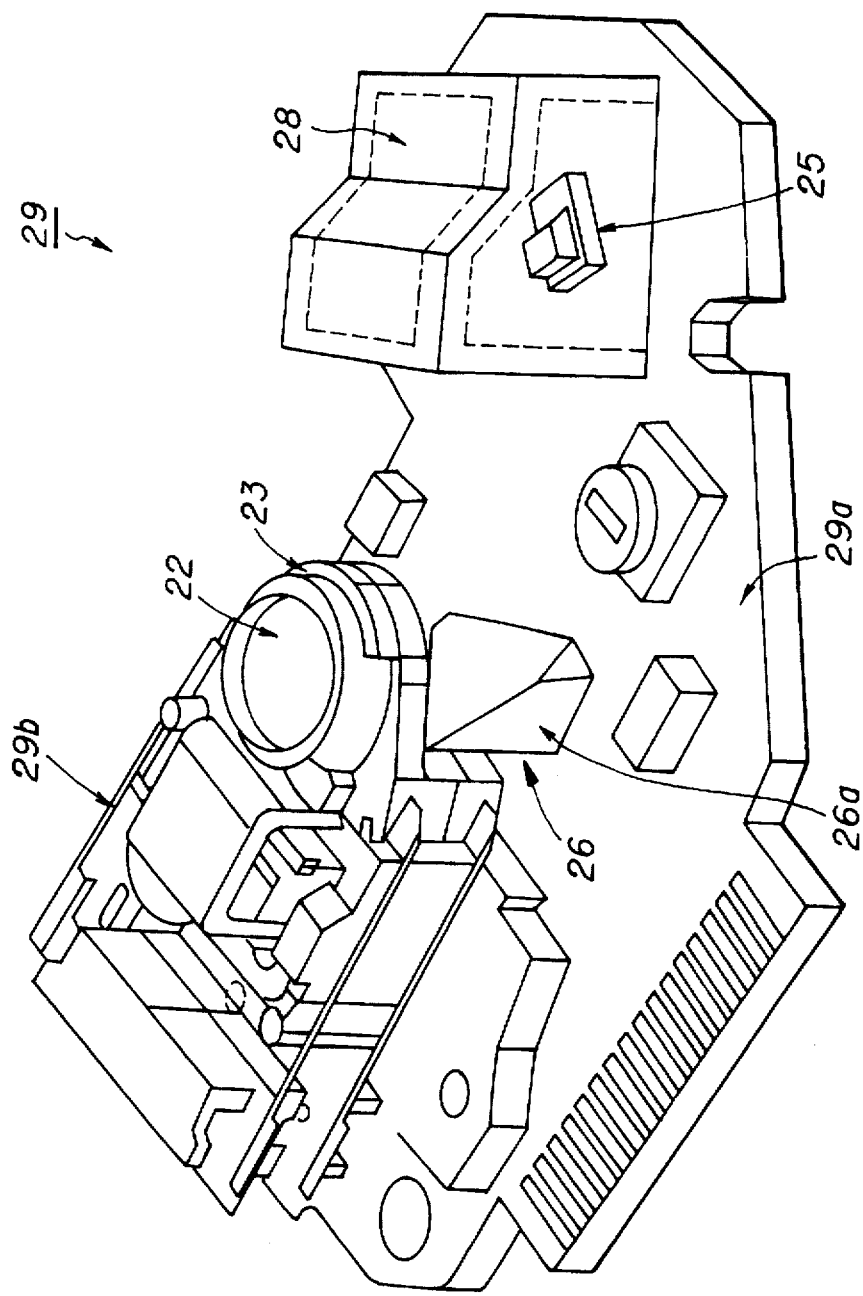
FIG. 4 is a schematic view showing another, second example of a conventional optical pick-up.
Figure 5:
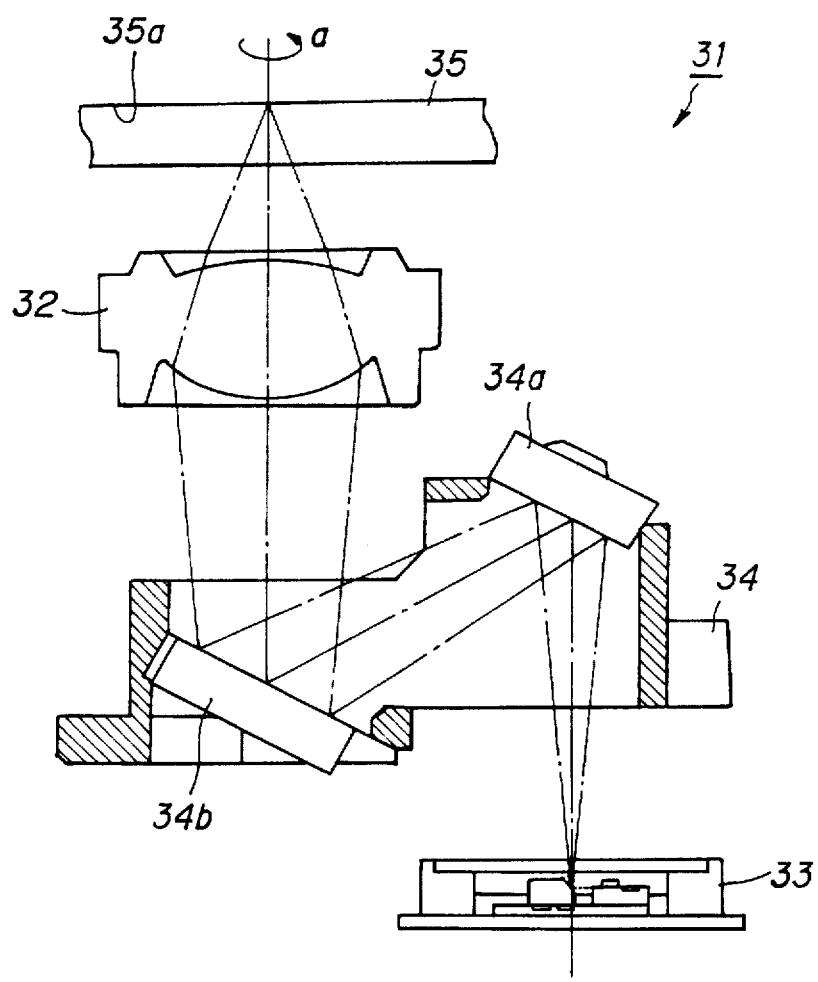
FIG. 5 is a schematic view showing another, third example of a conventional optical pick-up.
Figure 6:
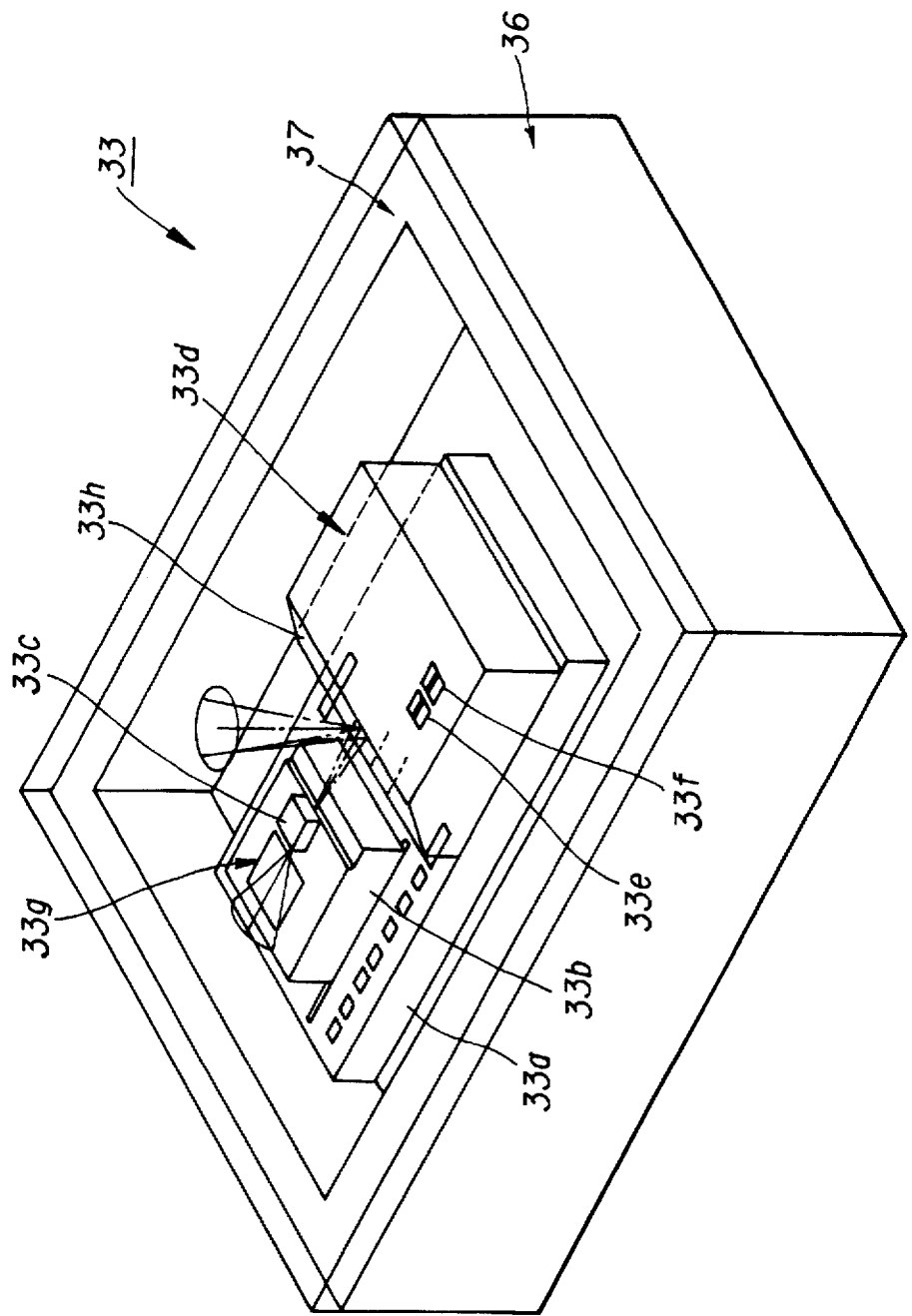
FIG. 6 is an enlarged perspective view showing the structure of the light-emitting and detecting device of the optical pick-up of FIG. 5.
Figure 7:
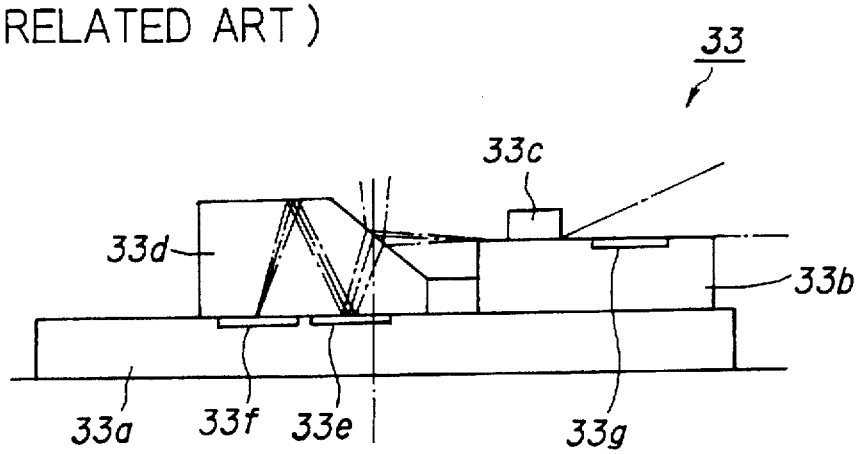
FIG. 7 is a cross-sectional view showing the light-emitting and detecting device of FIG. 6.
Figure 8:
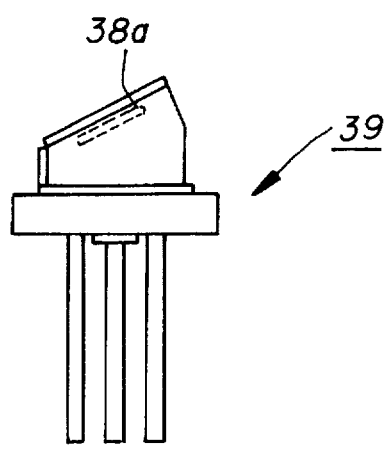
FIG. 8 is a schematic view showing an example of a structure of a semiconductor laser element provided with a glass plate for astigmatic difference correction for use with a conventional optical pick-up.

The light-emitting and detecting device 44 is almost the same as that in FIG. 1. However, as shown in FIG. 9, a second semiconductor substrate 44b for outputting light is mounted on a first semiconductor substrate 44a, a semiconductor laser 44c is built on this second semiconductor substrate 44b as a light-emitting element, and a generally trapezoidal-shaped microprism 44d is provided on the first semiconductor substrate 44a in front of the semiconductor laser 44c. Further, the light-emitting and detecting device 44 is completely covered by the cover 47 which functions as a light deflecting part or portion of the combination. A reflecting surface 47a is also provided at the inner surface of the cover 47 and is inclined at an angle of 45 degrees so as to face a raised mirror 45a in the optical system 45. In this way, a light-beam L1 emitted from the semiconductor laser 44c progresses to the signal recording surface 46a of the optical disc 46 along a light path that is almost the same as that of FIG. 1. Further, light returning from the signal recording surface 46a of the optical disc 46 passes via the reflecting surface 47a of the cover 47 through the inclined surface of the microprism 44d so as to reach the bottom surface of the microprism 44d. A portion of the returning light hat reached the bottom surface of the microprism 44d passes through the bottom surface and part is reflected by the bottom surface so as to proceed toward the upper surface of the microprism 44d. A first light detector 44e is formed on the first semiconductor substrate 44a at the lower part of the position of the incident returning light of the microprism 44d. Further, returning light reflected at the bottom surface is reflected at the upper surface of the microprism 44d and is then again incident to the bottom surface of the microprism 44d. Moreover, a second light detector 44f is formed on the first semiconductor substrate 44a at the lower part of the bottom surface portion of the microprism 44d to which the returning light reflected at the upper surface of the microprism 44d is incident.

The first light detector 44e and the second light detector 44f are divided into a plurality of sensor blocks, with detection signals for each sensor block being outputted independently. A third light detector 44g is provided on the second semiconductor substrate 44b on a side opposite to the output side of the semiconductor laser 44c. The third light detector 44g is for monitoring the intensity of light emitted by the semiconductor laser 44c.

The inner surface 47a of the cover 47 which acts as a light deflecting part is constructed as a light absorbing portion 47c except for the reflecting surface 47a and the front surface 47b as the transparent portion. The cover 47 can be made from, for example, plastic or the like, which is a transparent material. Alternatively, as the portions other than the front surface 47b as the transparent part do not have to be transparent to light, the cover can also be formed by a two-color molding using, for example, transparent optical plastic such as acrylic, polyester, or amorphous polyolefin and an opaque resin such as polypdshenylene sulfide (PPS) and a thermosetting epoxy resin and so forth, or an integral molding of transparent glass and opaque resin and the like.

Figure 10:
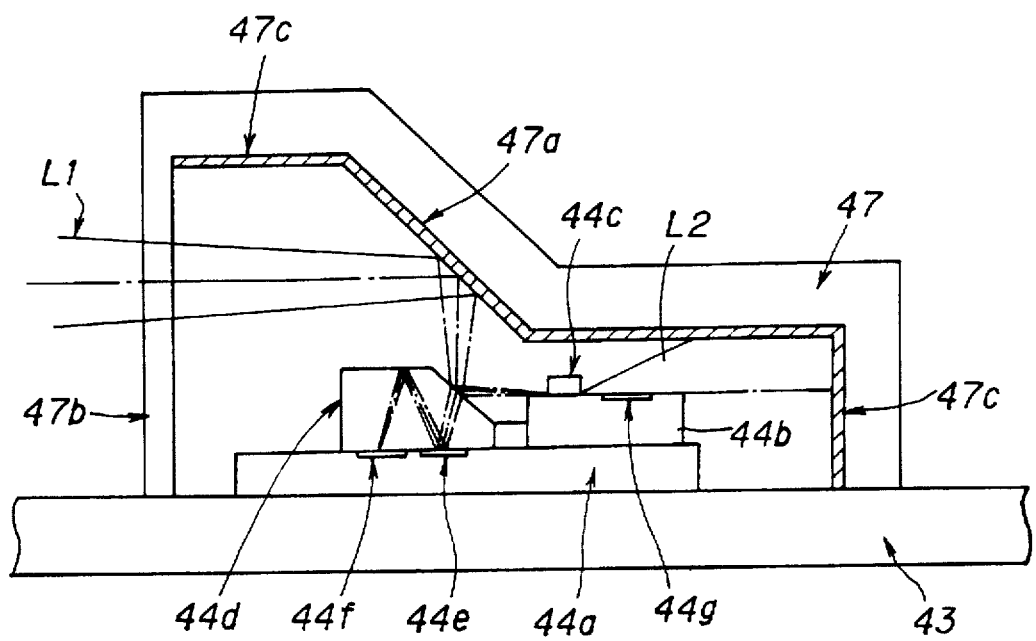
FIG. 10 is an enlarged cross-sectional view showing the essential parts of the optical pick-up of FIG. 9.
Figure 11:
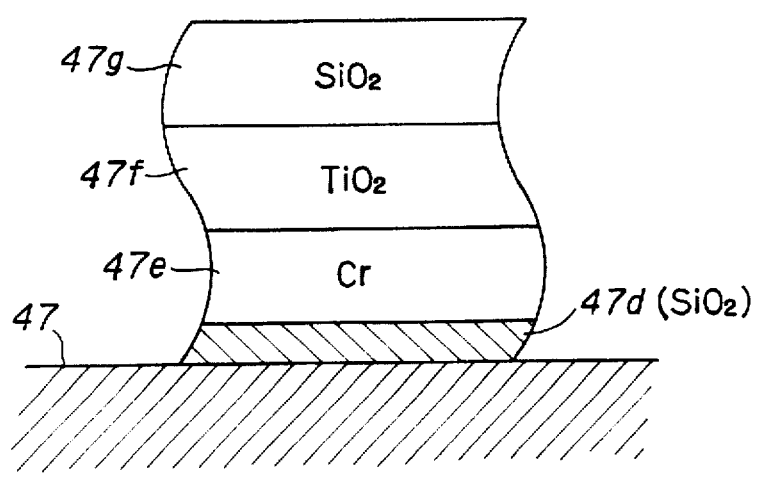
FIG. 11 is an enlarged cross-sectional view showing an example of the structure of the light absorbing portion of the light deflecting cover of FIG. 10.

Further, as best seen in FIGS. 10 and 11, the reflecting surface 47a is constructed from, for example, a dielectric multi-layer film or a highly-reflective metal film. Moreover, the light absorbing portion 47c is constructed by laminating a binder layer 47d comprising SiO2 and the like, a metal absorbing layer 47e comprising chrome and the like, and a non-reflecting film 47f comprising TiO2 and the like at the inner surface of the cover 47 and then forming a protective layer 47g comprising SiO2 and the like on top, in the way shown in FIG. 11, so that the light absorbing portion 47c has the characteristic of absorbing unnecessary light. However, the application of dark paint or surface treatment of dark material may also be used in this construction.

By constructing this embodiment in the above way, at the optical pickup of this embodiment, a light beam L1 incident to the optical disc 46 is limited by an opening 42a of the holder 42 (best seen in FIG. 9) so as to contribute to signal recording or playing back with respect to the optical disc 46, but light outside of the light beam L1 is not necessary. Further, the lower side portion of a light beam L2 outputted from the semiconductor laser 44c in the rear direction for controlling outputted light is utilized by being incident to the optical detector 14g but the upper-side portion thereof is unnecessary.

When the unnecessary light is then either directly or indirectly incident to the first and second light detectors 44e and 44f, the operating characteristics of the optical pick-up 40 become unstable, and in the worst case, malfunctions will occur. However, this unnecessary light is removed by absorption at the light absorbing portion 47c at the inner surface of the cover 47 as the light deflecting part. In this way, the optical pick-up 50 is able to carry out accurate signal recording or playback without operating characteristics thereof becoming unstable as a result of the unnecessary light.

Figure 12:
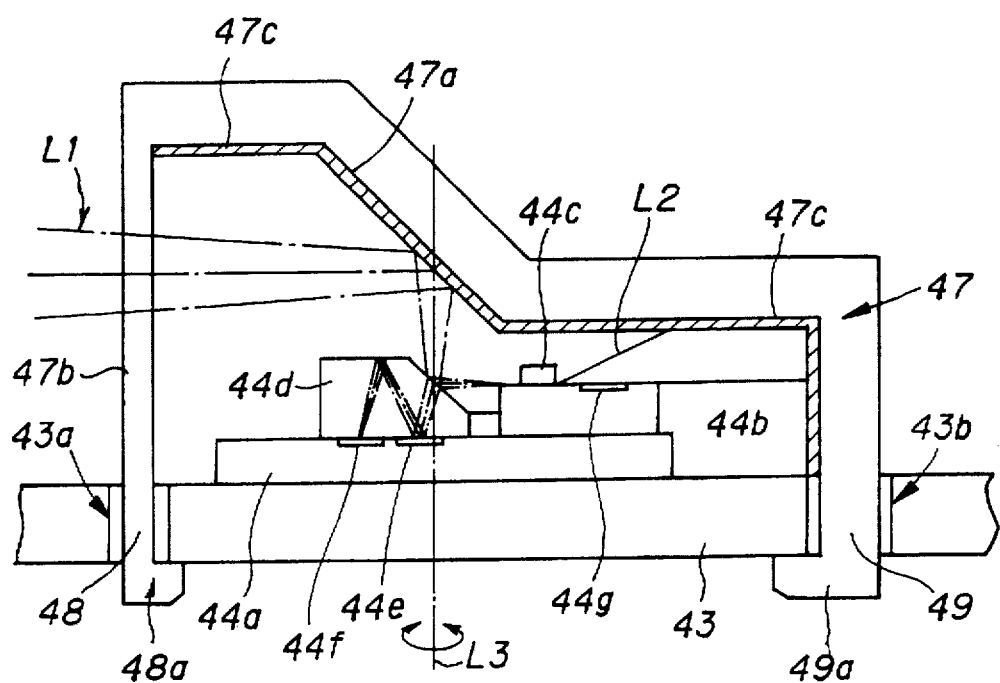
FIG. 12 is an enlarged cross-sectional view showing a second embodiment of an optical pick-up equipped with a light deflecting cover according to the present invention.

FIG. 12 shows a second embodiment of a light deflecting part according to the present invention. In FIG. 12, the light deflecting portion of the cover 47 has almost the same structure as the embodiment in FIG. 9 and FIG. 10 and is equipped with a reflecting surface 47a, a transparent part 47b and a light absorbing portion 47c. Further, the cover 47 is equipped with engaging parts 48 and 49 respectively protruding downwardly from the front end and the rear end. The engaging parts 48 and 49 each respectively have engaging prongs 48a and 49a projecting from the inner side of their lower ends. Mounting holes 43a and 43b for receiving each of the engaging parts 48 and 49 are provided at the base or substrate 43. Each of the mounting holes 43a and 43b is formed in an arc-shape with its center being the optical axis L3 of the light beam reflected along the upper direction by the inclined surface of the microprism 44d. Thus, when the engaging parts 48 and 49 of the cover 47 are inserted into the mounting holes 43a and 43b of the base 43, the engaging prongs 48a and 49a are put into the mounting holes 43a and 43b as a result of each of the engaging parts 48 and 49 being deformed outwardly. Then, with the cover 47 mounted on the surface of the base 43, the engaging prongs 48a and 49a pass through the mounting holes 43a and 43b and subsequently return to their original shape as a result of their elasticity. As a result, the engaging prongs 48a and 49c engage with the lower surface of the base 43 and the cover 47 is therefore rotatably fixed to the base 43.

The cover 47 rotates around the optical axis L3 because the mounting holes 43a and 43b are formed in an arc-shape, as described above. The direction of deflection of the light beam due to the reflecting surface 47a of the cover 47 therefore is rotatively adjusted within a plane parallel with the surface of the base 43. In this way, when there are shifts in the optical axis due to errors in attaching each of the optical parts, the optical axis of deflections due to the reflecting surface 47a of the cover 47 as the light deflecting part can be adjusted to an optimum state of the outputted beam intensity by measuring the intensity distribution of the beam outputted from the objective lens 41 while rotating the cover 47 about the above described optical axis L3 after, for example, assembling the optical parts of the optical pick-up 40. Namely, the direction of deflection is adjusted within a plane parallel with the base 43 by rotating the cover 47 as the light deflecting part about the optical axis L3 as described above. As a result, accuracy required in mounting the light-receiving and detecting device 44 can be lowered to allow easy assembly with reduced cost.

In connection with the above two embodiments, a description is given for an optical pick-up 40 for use with a compact disc. However, the present invention is by no means limited in this respect and may also be apparently applied to optical pick-ups and their light deflecting parts for other types of optical discs including magneto-optical discs such as mini-discs and so forth. As described above, according to the present invention, a small, lightweight and highly reliable light deflecting part, such as its cover, and an optical pick-up using this light deflecting part are provided by removing unnecessary light from the light-emitting element.

Thus, as described in connection with the first two embodiments of the invention, a light deflecting part or cover 47, which has a reflecting part 47a disposed in a light path of a light beam projected from a light-source of an optical pick-up or light returning from an optical disc for deflecting a light beam so as to bend the light-path, is constituted so that the light deflecting part 47 is equipped with a light absorbing part 47c for removing unnecessary light which does not contribute to the operating characteristics of the optical pick-up.

Figure 13:
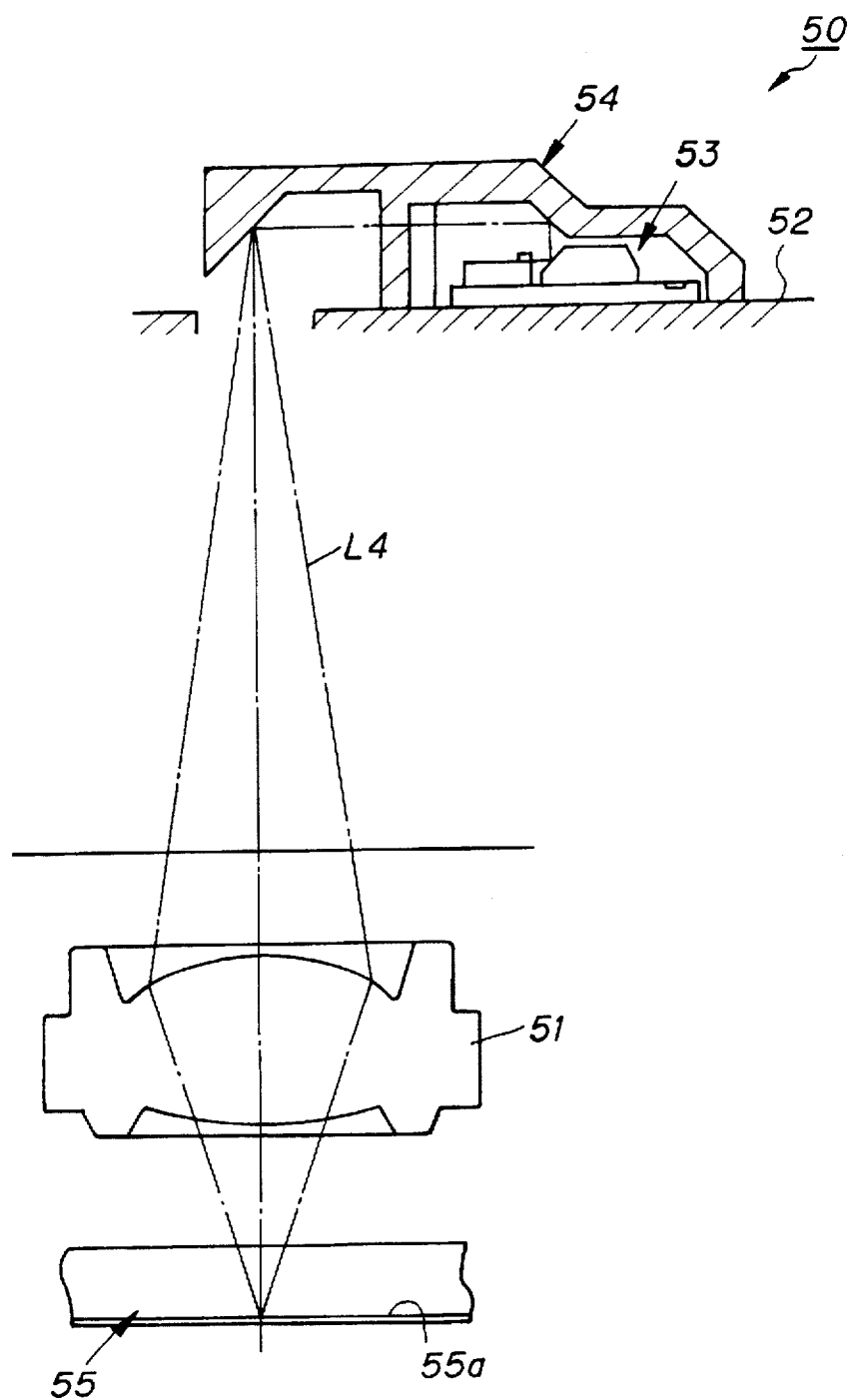
FIG. 13 is a schematic view showing an optical pick-up in which a first embodiment of a light-emitting and detecting device provided with a cover according to the present invention is incorporated.

FIG. 13 is a view showing a preferred second embodiment of an optical pick-up according to the present invention for use with a compact disc provided with the light-emitting and detecting device and cover.

In FIG. 13, the optical pick-up 50 includes an objective lens 51, a base or substrate 52, and a cover 54 with a light-emitting and detecting device 53 disposed on a base 52 and an optical system being integrally incorporated into the cover 54, in a manner like the previously described embodiments of the invention shown in FIGS. 9 and 12. At the optical pick-up 50, by shifting an objective lens 51 in the focusing and tracking directions, laser light L4 projected from the light-emitting and detecting device 53 passes via the optical system within the cover 54 and the objective lens 51 and is focused at a point on the signal recording surface 55a of an optical disc 55 being rotatably driven below the objective lens 52, as shown in the drawings. Light L4 returning from the signal recording surface of the optical disc 55 is then projected into the light-emitting and detecting device 54 via the objective lens 51 and the optical system within the cover 54. The cover 54 is attached to the base 52 in an air-tight manner so as to cover the entire light-emitting and detecting device 54 and protect it from the open air.

Figure 14:
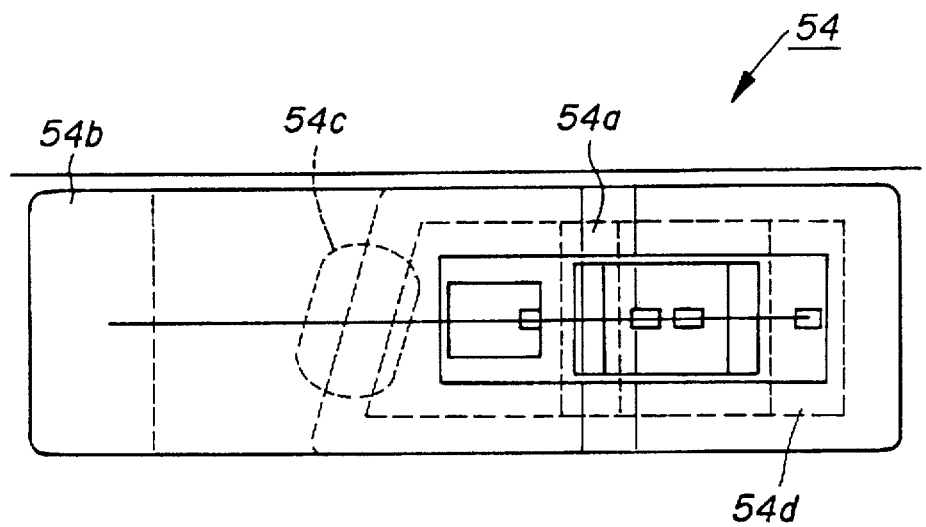
FIG. 14 is an enlarged plan view of the cover of the optical pick-up of FIG. 13.
Figure 15:
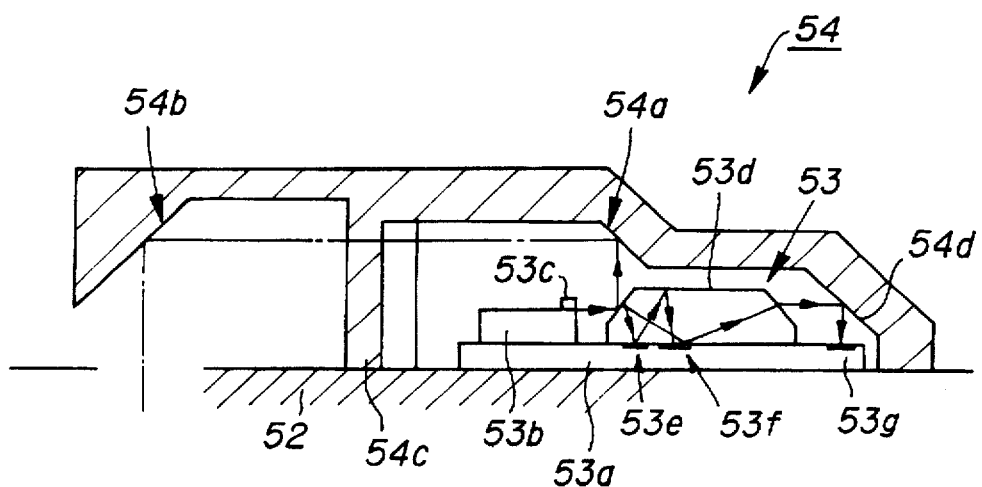
FIG. 15 is an enlarged cross-sectional view of the cover of the optical pick-up of FIG. 13.

The optical system within the cover 54, as shown in FIG. 14 and FIG. 15, is for guiding laser light projected from the light-emitting and detecting device 53 to the objective lens 51 and then guiding light returning from the optical disc 55 from the objective lens 51 to the light-emitting and detecting device 53, as generally described previously. This optical system is provided with a first reflecting surface 54a and a second reflecting surface 54b incorporated into the inner surface of the cover 54 and a plate 54c for astigmatic difference correction provided between the reflecting surfaces 54a and 54b. The cover 54 is further provided with a third reflecting surface 54d inclined at an angle of 45 degrees facing downwardly at the inner surface near the end part (i.e. the right-side end part in the drawings) on the opposite side from the second reflecting surface 54b.

The first reflecting surface 54a is inclined at an angle of 45 degrees so as to reflect a light beam propagating in an upward direction from the light-emitting and detecting device 53 approximately parallel to the surface of the base 52. The second reflecting surface 54b is also inclined in the same way at an angle of 45 degrees so as to guide a light beam propagating horizontally to travel downward due to reflection by the first reflecting surface 54a. The plate 54c is integrally formed together with the cover 54, is light-transmitting, and, as is shown in FIG. 14, is inclined with respect to the optical axis of the light beam from the light-emitting and detecting device 53. In this way, the astigmatic difference of a light beam from the light-emitting and detecting device 53 is corrected while passing through this plate 54c. The cover 54 can be made from, for example, a transparent plastic material and the like. Alternatively, as portions other than the plate 54c do not have to be transparent to light, the cover can also be formed by a two-color molding using, for example, transparent optical plastic such as acrylic, polyester, or amorphous polyolefin and an opaque resin such as polyphenylene sulfide (PPS) and a thermosetting epoxy resin and the like, or an integral molding of transparent glass and opaque resin and the like, and so forth. Further, the reflecting surfaces 54a, 54b and 54d can be constructed from, for example, dielectric multi-layer films or highly-reflective metal films. It is preferable for portions of the inner surface of the cover 54 other than the reflecting surfaces 54a, 54b and 54d to be formed with, for example, light-absorbing films so, as to have the characteristic of absorbing unnecessary light. Further, black-colored material can be applied or surface treatment can be carried out using black-colored materials.

Figure 16:
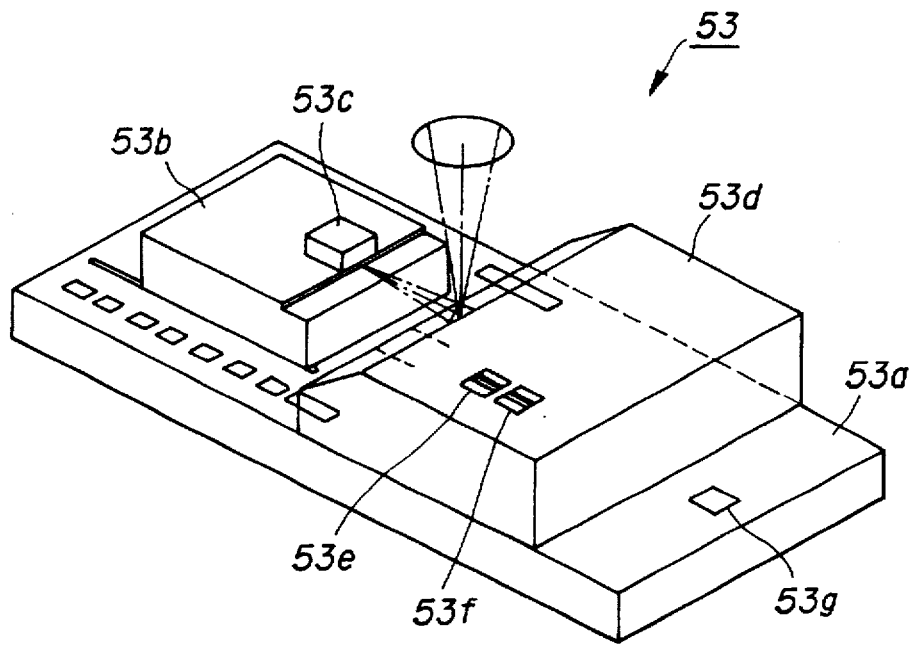
FIG. 16 is an enlarged perspective view of the light-emitting and detecting device of the optical pick-up of FIGS. 13 and 15.
Figure 17:
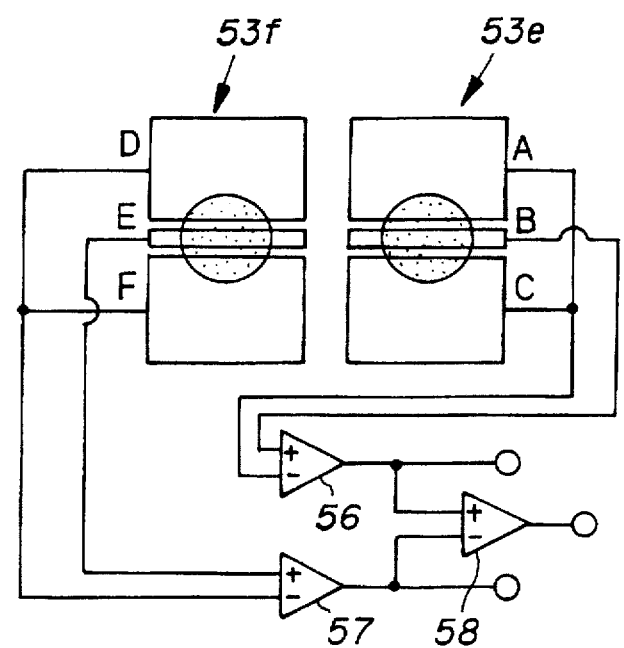
FIG. 17 is an enlarged plan view showing an in-focus condition of the first and second light detectors of the light-emitting and detecting device of the optical pick-up of FIG. 13.

Laser light projected from the light-emitting and detecting device 53 becomes incident to the objective lens 51 by passing through the first reflecting surface 54a, the plate 54c and the second reflecting surface 54b as a result of the objective lens 51 being adjustably shifted in the focusing and tracking directions by a twin-axial or bi-axial actuator which is not shown in the drawings. The laser light is then focused onto the signal recording surface of the optical disc 55 by the objective lens 51. Light returning from the signal recording surface of the optical disc 55 is then reflected by the objective lens 51 and the second reflecting surface 54b, passes through the plate 54c, is reflected by the first reflecting surface 54a and is then incident to the light-emitting and detecting device 53. The light-emitting and detecting device 53 is also provided with a second semiconductor substrate 53b for outputting light mounted on a first semiconductor substrate 53a, as shown in FIG. 16, with a semiconductor laser element 53c being provided as a light-emitting element on the second semiconductor substrate 53b. A trapezoid-shaped microprism 53d is also provided on the first semiconductor 53a at the front of the semiconductor laser element 33c in such a manner that an inclined semi-transparent surface faces the semiconductor laser element 53c. In this way, a light beam projected from the semiconductor laser element 53c along the surface of the second semiconductor substrate 53b is reflected by the inclined surface of the microprism 53d, proceeds in an upward direction, is reflected by the first reflecting surface 54a of the cover 54, passes through the plate 54c and proceeds in the direction of the second reflecting surface 54b. Further, light returning from the signal recording surface of the optical disc 55 travels by way of the second reflecting surface 54b of the cover 54, the plate 54c and the first reflecting surface 54a, passes through the inclined surface of the microprism 53d, and reaches the bottom surface of the microprism 53d. The portion of the returning light that reaches the bottom surface of the microprism 53d passes through the bottom surface and another portion is reflected at the bottom surface so as to proceed in a direction toward the upper surface of the microprism 53d. Here, a first light detector 53e is formed at the first semiconductor substrate 53a at the lower part of the position of incidence of light returning from the microprism 53d. Returning light reflected at the bottom surface is reflected at the upper surface of the microprism 53d and again becomes incident to the bottom surface of the microprism 53d. Further, a second light detector 53f is formed at the first semiconductor substrate 53a at the lower part of the bottom portion of the microprism 53d to which returning light reflected at the upper surface of the microprism 53d is incident. Each of the first light detector 53e and the second light detector 53f are divided into a plurality (three in the case shown in the drawings, one at the center and two on either side) of sensor blocks A, B, C, D, E and F, as shown in FIG. 17. Detection signals SA, SB, SC, SD, SE and SF for each of the sensor blocks A, B, C, D, E and F are outputted independently.

Moreover, a third light detector 53g is provided on the first semiconductor 53a on the side of the microprism 53d opposite to the side on which the second semiconductor 53b is mounted. The third light detector 53g monitors the intensity of the light emitted from the semiconductor laser element 53c and is therefore provided so that light projected from the semiconductor laser element 53c is incident from the inclined surface of the microprism 53d. After being projected from the end surface of the opposite side of the microprism 53d, the light is also reflected by the third reflecting surface 54d of the cover 54 so as to be incident to the third light detector 53g.

The third preferred embodiment is constructed as above, and laser light projected from the semiconductor laser element of the light-emitting and detecting device 53 is incident to the inclined surface of the microprism 53d and is reflected by the inclined surface. Laser light reflected by the inclined surface of the microprism 53d is reflected by the first reflecting surface 54a of the cover 54 and is focused onto a desired track position of the signal recording surface of the optical disc 55 via the second reflecting surface 54b and the objective lens 51 after an astigmatic difference is corrected at the plate 54c. Light returning from the optical disc 55 again becomes incident to the inclined surface of the microprism 53d of the light-emitting and detecting device 53 via the objective lens 51, the second reflecting surface 54b, the astigmatic-difference-correcting plate 54c and the first reflecting surface 54a, and then proceeds to within the microprism 53d by passing through the inclined surface.

Figure 18:
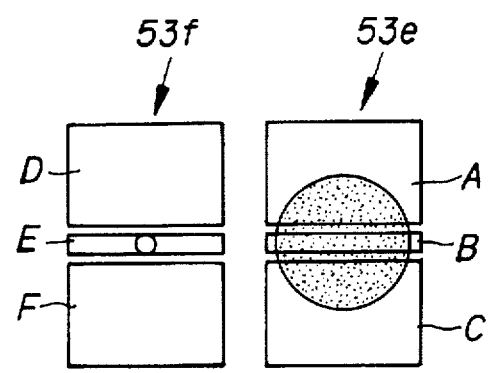
FIG. 18 is an enlarged plan view showing the first and second light detectors in the case where the optical disc is closer than an in-focus position.
Figure 19:
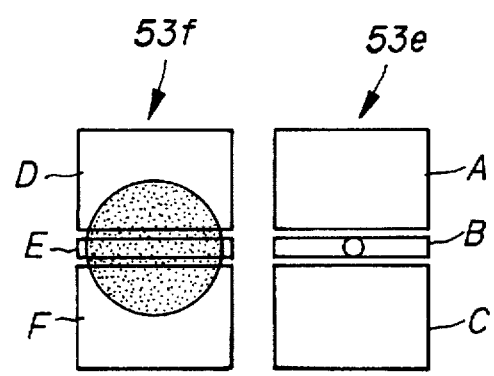
FIG. 19 is an enlarged plan view showing the first and second light detectors in the case where the optical disc is further than an in-focus position.

A portion of the returning light that was incident within the microprism 53d that reaches the bottom surface of this microprism 53d passes through and part is reflected in the direction of the upper surface of the microprism 53d. Returning light which has passes through the bottom surface is incident to the first light detector 53e, while, on the other hand, returning light reflected at the bottom surface is reflected at the upper surface of the microprism 53d, passes through the bottom surface of the microprism 53d, and is then incident to the second light detector 53f. When the optical disc 55 is in a "just in focus" position, the spots formed on the first light detector 53e and the second light detector 53f are the same size, as shown in FIG. 17. Further, when the optical disc 55 is too close, the spot formed on the first light detector 53e becomes larger and the spot formed on the second light detector 53f becomes smaller, as shown in FIG. 18. Moreover, when the optical disc 55 is too far, the spot formed on the first light detector 53e becomes smaller and the spot formed on the second light detector 53f becomes larger, as shown in FIG. 19. In this way, returning light is incident to the first light detector 53e and the second light detector 53f and the relative sizes of the spots formed on each of the light detectors 53e and 53f change in response to the focus state of the optical disc 55. Thus, a playback signal can be detected on the basis of the detection signals from each of the sensors of the light detectors 53e and 53f, a focus signal can be detected by using a so-called differential 3-dividing method (D−3DF), and a tracking error signal can be detected on the basis of the difference of the detection signals of each of the sensor parts of the first light detector 53e.

For example, in the differential 3-dividing method, the focus error signal FE can be obtained from $$FE=(SB+SD+DF)-(SA+SC+SE)$$ [Equation 1]

based on the detection signals SA to SF from the first light detector 53e and the second light detector 53f. Further, the tracking error signal TE is obtained from $$TE=(SA+SB+SC)-(SD+SE+SF).$$ [Equation 2]

Moreover, the playback signal RF is obtained from $$RF=(SA+SB+SC)+(SD+SE+SF).$$ [Equation 3]

When a light beam projected from the semiconductor laser element 53c of the light-emitting and detecting device 53 is incident to the inclined surface of the microprism 53d, a portion of the light proceeds to the inside of the microprism 53d and, after being projected from the end surface on the opposite side of the microprism 53d, is reflected by the third reflecting surface 54d formed at the inner surface of the cover 54 so as to be incident to the third light detector 53g on the first semiconductor substrate 53a. In this way, monitoring of the amount of light for the semiconductor laser element 53c is carried out. In this case, because returning light from the optical disc 55 is not incident to the third light detector 53g, interference due to the returning light is eliminated and the amount of light emitted by the semiconductor laser element 53c can be reliably monitored. Then, the amount of light for the light beam projected at the signal recording surface of the optical disc 55 can be accurately controlled to improve stability of the playback operation of the optical pick-up 50.

In the above third embodiment, a description has been given for the case of an optical pick-up 50 for use with a compact disc. However, the present invention is by no means limited in this respect and may also be apparently applied to light-emitting and detecting devices and their covers for optical pick-ups for other types of optical discs including magneto-optical discs such as mini-discs. According to the present invention described above, a light-emitting and detecting device and a cover thereof are provided for use in an optical pick-up in which astigmatic difference is corrected and which is small in structure.

What is claimed is:

1. An optical pick up apparatus comprising:
   a semiconductor laser unit for generating a light beam,
   detecting means for detecting said light beam;
   a semiconductor substrate providing said semiconductor laser unit and said detecting means; and
   a cover unit for covering said semiconductor substrate, wherein said cover unit is provided with a penetrating part for penetrating said light beam, a reflecting part for reflecting said light beam, and an absorbing part for absorbing said light beam.

2. An optical pick up apparatus according to claim 1, wherein said apparatus further comprises a light emitting/receiving element comprising a beam splitting prism affixed on said semiconductor substrate, and said detecting means is provided under said prism.

3. An optical pick up apparatus according to claim 1, wherein said apparatus further comprises monitor means for monitoring laser power of said semiconductor laser unit on said semiconductor substrate.

4. An optical pick up apparatus according to claim 1, wherein said absorbing part is constructed by laminating a binder layer, a metal absorbing layer and a non-reflecting layer at the inner surface of said cover unit, and then forming a protective layer on top thereof.

5. An optical pick up apparatus according to claim 1, wherein said absorbing part is constructed by a dark material.

6. An optical pick up apparatus according to claim 1, wherein said cover unit is provided with a correcting means for correcting an astigmatic difference in said light beam from said semiconductor laser unit.

7. An optical pick up apparatus according to claim 1, wherein said cover unit is attached to a base member which is arranged relative to said light emitting means and said detecting means so that a direction of the reflecting part is rotatable in a plane perpendicular to the optical axis.

8. An optical pick-up apparatus comprising:
   a light-emitting means for generating a light beam;
   detecting means for detecting said light beam;
   optical guiding means for guiding said light beam to an optical recording medium from said light emitting means and reflecting said light beam to said detecting means from said recording medium; and
   a cover unit for covering said light emitting means and said detecting means, wherein said cover unit is provided with a correcting means for correcting an astigmatic difference in said light beam from said light emitting means.

9. An optical pick-up apparatus according to claim 8, wherein said light emitting means and said detecting means are arranged on a wiring board on which a wiring pattern is formed.

10. An optical pick-up apparatus according to claim 8, wherein said cover unit comprises a first portion for penetrating said light beam and a second portion for shading said light beam, said correcting means providing said first portion.

11. An optical pick up apparatus according to claim 10, wherein said cover unit is provided with a reflecting portion for reflecting said light beam on said second portion.

12. An optical pick up apparatus according to claim 11, wherein said cover unit is provided with an absorbing portion for absorbing said light beam with said reflecting portion on said second portion for reflecting said light beam.

13. An optical pick-up apparatus according to claim 10, wherein said cover unit forms said second portion and said correcting means as one body.

14. An optical pick-up apparatus according to claim 8, wherein said correcting means is provided so as to be inclined with respect to an optical axis of said light beam.

15. An optical pick-up apparatus according to claim 8, wherein said apparatus further comprises monitor means for monitoring laser power of said light emitting means, and said monitor means, and said light emitting means and said detecting means are arranged on a wiring board on which a wiring pattern is formed.

16. An optical pick-up apparatus according to claim 8, wherein said cover unit is attached to said base member which is arranged relative to said light emitting means and said detecting means so that a direction of said reflecting part is rotatable in a plane perpendicular to the optical axis.

17. An optical pick-up apparatus comprising;
   a semiconductor laser unit for generating a light beam;
   detecting means for detecting said light beam;
   a semiconductor substrate, providing said semiconductor laser unit and said detecting means;
   a light emitting/receiving element comprising a beam splitting prism supported on said semiconductor substrate, and said detecting means is provided under said prism; and
   a cover unit for covering said semiconductor substrate, wherein said cover unit is provided with a correcting means for correcting an astigmatic difference in said light beam from said semiconductor laser unit.

18. An optical pick-up apparatus according to claim 17, wherein said cover unit comprises a first portion for penetrating said light beam and said second portion for shading said light beam, and said correcting means is provided on said first portion.

19. An optical pick up apparatus according to claim 18, wherein said cover unit is provided with a reflecting portion on said second portion for reflecting said light beam.

20. An optical pick up apparatus according to claim 19, where said cover unit is provided with an absorbing part for absorbing said light beam with said reflecting portion on said second portion.

21. An optical pick up apparatus according to claim 18, where said cover unit forms said second portion and said correcting means as one body.

22. An optical pick up apparatus according to claim 17, wherein said cover unit further comprises a reflecting portion for reflecting said laser beam to said optical recording medium from said light emitting/receiving element.

23. An optical pick up apparatus according to claim 17, wherein said correcting means is provided so as to be inclined with respect to an optical axis of said light beam.

24. An optical pick up apparatus according to claim 10, wherein said apparatus further comprises monitor means for monitoring laser power of said semiconductor laser unit on said semiconductor substrate.

25. An optical pick up apparatus according to claim 24, wherein said cover unit comprises a reflecting portion for reflecting said laser beam to said monitor means.

26. An optical pick up apparatus according to claim 17, wherein said cover unit is attached to a base member which is arranged relative to said light emitting means and said detecting means so that a direction of said reflecting portion is rotatable in a plane perpendicular to the optical axis.

* * * * *